US012756712B2

(12) United States Patent
Ahmad et al.

(10) Patent No.: US 12,756,712 B2
(45) Date of Patent: Oct. 6, 2026

(54) MANAGING ACCESS CONTROL USING POLICY EVALUATION MODE

(71) Applicant: Stripe, LLC, South San Francisco, CA (US)

(72) Inventors: Aaltan Ahmad, San Francisco, CA (US); Surbhi Shah, Mountain View, CA (US); Matthew Moresco, Brooklyn, NY (US)

(73) Assignee: Stripe, LLC, South San Francisco, CA (US)

(*) Notice: Subject to any disclaimer, the term of this patent is extended or adjusted under 35 U.S.C. 154(b) by 285 days.

(21) Appl. No.: 17/846,489

(22) Filed: Jun. 22, 2022

(65) Prior Publication Data

US 2023/0421563 A1 Dec. 28, 2023

(51) Int. Cl.
*H04L 29/06* (2006.01)
*H04L 9/40* (2022.01)

(52) U.S. Cl.
CPC ............ *H04L 63/102* (2013.01); *H04L 63/20* (2013.01)

(58) Field of Classification Search
None
See application file for complete search history.

(56) References Cited

U.S. PATENT DOCUMENTS 10,225,152 B1 * 3/2019 Roth .................. G06F 21/6236
10,986,131 B1 * 4/2021 Kruse .................. H04L 63/10
2013/0246470 A1 * 9/2013 Price .................. G06F 16/13 707/783
2014/0359692 A1 * 12/2014 Chari .................. G06F 21/31 726/1
2016/0127417 A1 * 5/2016 Janssen .................. H04L 63/1433 726/1
2017/0011215 A1 * 1/2017 Poiesz .................. G06F 21/6209
2017/0149829 A1 * 5/2017 Oshurkov .................. H04L 63/10
2017/0257372 A1 * 9/2017 Meriac .................. H04L 67/34
2018/0268126 A1 * 9/2018 Kaushik .................. G06F 21/57
2019/0007418 A1 * 1/2019 Cook .................. H04N 21/443
2019/0028514 A1 * 1/2019 Barboi .................. H04L 63/20
2019/0089705 A1 * 3/2019 Chud .................. H04L 63/102
2020/0252431 A1 * 8/2020 Byrne .................. H04L 63/10
2021/0103461 A1 * 4/2021 Esibov .................. G06F 21/32
2021/0133196 A1 * 5/2021 Gladwin .................. G06F 16/2428
2021/0211470 A1 * 7/2021 Wood .................. H04L 63/08
2021/0294903 A1 * 9/2021 Hicks .................. G06F 11/0709
2021/0329003 A1 * 10/2021 Segal .................. H04L 63/104
2022/0086157 A1 * 3/2022 Masjuan .................. H04L 63/20
2022/0201043 A1 * 6/2022 Pugalia .................. G06F 21/604
2022/0303313 A1 * 9/2022 Gargaro .................. H04L 63/1425
2023/0177201 A1 * 6/2023 Durand .................. G06F 21/6227 726/4

(Continued)

*Primary Examiner* — Eleni A Shiferaw
*Assistant Examiner* — Hassan A Hussein
(74) *Attorney, Agent, or Firm* — Foley & Lardner LLP

(57) ABSTRACT

Various embodiments include systems, methods, and non-transitory computer-readable media for managing access control. Consistent with these embodiments, a method includes receiving a request to access a resource, determining one or more access control policies that correspond to an access to the resource; identifying an access control policy that allows the identity to access the resource, determining, that the identified access control policy is associated with a policy evaluation mode, and authorizing the request based on the access control policy.

18 Claims, 8 Drawing Sheets

(56) References Cited

U.S. PATENT DOCUMENTS

| | | | | |
|---|---|---|---|---|
| 2023/0275931 | A1* | 8/2023 | Griffin | H04L 63/10<br>726/1 |
| 2023/0370466 | A1* | 11/2023 | Li | G06F 21/6218 |
| 2024/0196373 | A1* | 6/2024 | Lee | H04W 72/02 |

* cited by examiner

MANAGING ACCESS CONTROL USING POLICY EVALUATION MODE

TECHNICAL FIELD

The present disclosure generally relates to managing access control using a policy evaluation mode, and, more particularly, various embodiments described herein provide for systems, methods, techniques, instruction sequences, and devices that facilitate access control management.

BACKGROUND

Current systems provide requesters with permissions to access certain resources based on rules, such as access control policies. A change to the access control policies may cause denials of requests from users or services that no longer have access to the resources. Such denials may cause inadvertent downstream consequences, including Application Programming Interface (API) outage and system latency, especially when the change to the access control policies is recent and the requesting users or services have not yet fully adjusted to handle the change.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

Figure 1:
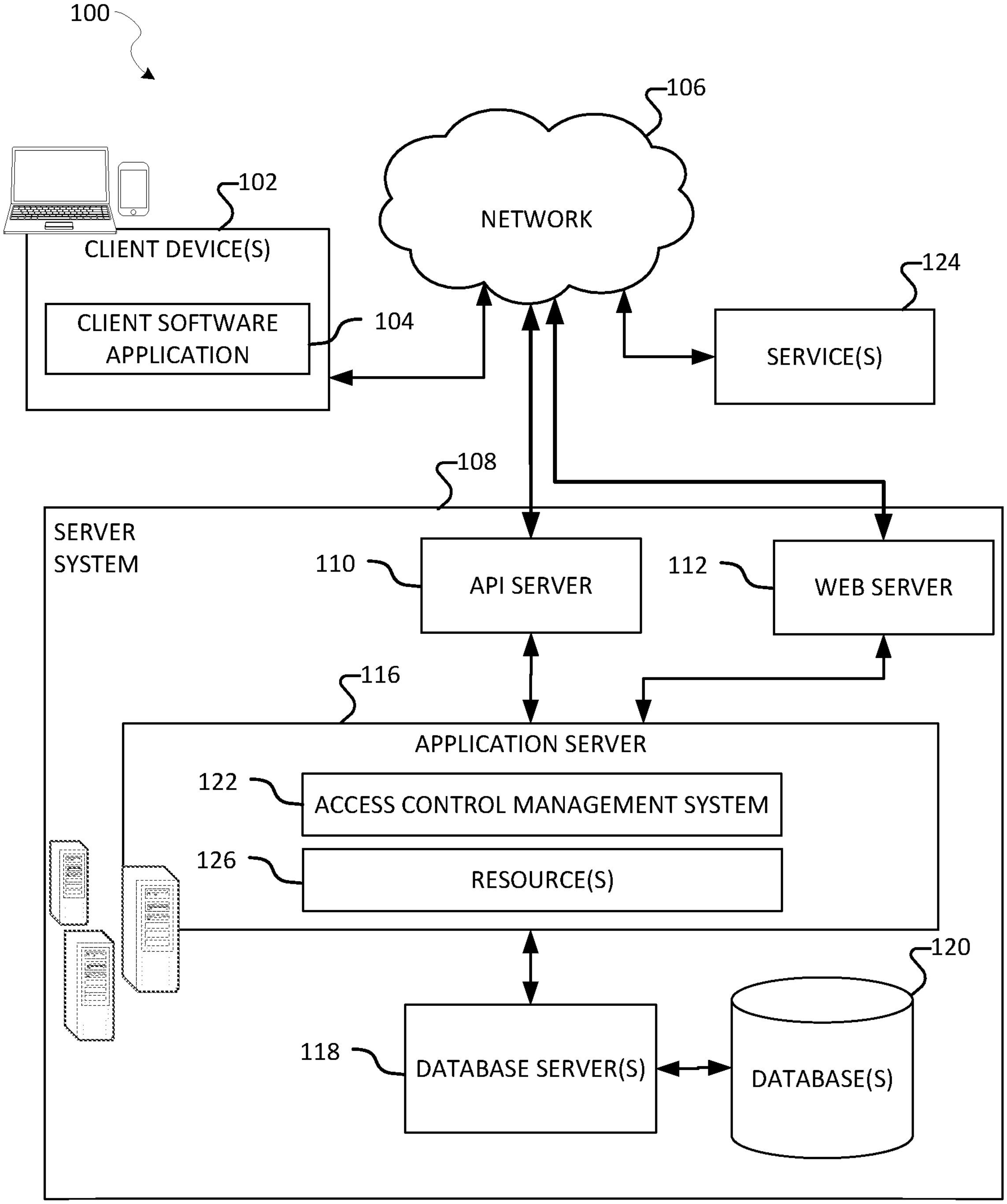
FIG. 1 is a block diagram showing an example networked environment that includes an access control management system, according to various embodiments of the present disclosure.

The description that follows includes systems, methods, techniques, instruction sequences, and computing machine program products that embody illustrative embodiments of the present disclosure. In the following description, for purposes of explanation, numerous specific details are set forth in order to provide a thorough understanding of embodiments. It will be evident, however, to one skilled in the art that the present inventive subject matter may be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various embodiments may be given throughout this description. These are merely descriptions of specific embodiments. The scope or meaning of the claims is not limited to the embodiments given.

Various examples include systems, methods, and non-transitory computer-readable media for managing access control using a policy evaluation mode. Specifically, upon receiving a request to access a resource, an access control management system identifies an access control policy in (or associated with) a policy evaluation mode that allows the identity to access the resource. The policy evaluation mode may also be referred to as traffic check mode or traffic check evaluation mode. The request may be an API request and may be sent from an identity. An identity may be a user (e.g., a person or a group of people), a service, or an application. In various embodiments, a policy evaluation mode indicates that the access control policy includes one or more identities that no longer have the access to the resource, as a result of a recent policy change. For example, a recent policy change may be made to the access control policy or the resource to remove one or more identities from a list of identities with granted access. In response to the change, instead of immediately revising the existing access control policy to deny the one or more identities the access, the existing access control policy may instead be configured to operate in the policy evaluation mode for a controlled period of time. This way, the existing access control policy in the policy evaluation mode may still cause the access control management system to authorize requests from identities that recently are requested to lose access to the resource based on a recent policy change. Under this approach, such identities may be given time (e.g., a threshold period of time after the last post-change request was sent) to adjust their respective services or systems to avoid sending requests to access the resource. As a result, access denials incurred by these identities during the transition period may be largely reduced or be completely avoided, reducing the risks, such as API outage and the associated system latency. An API outage may be caused by a growing number of unexpected denials of API requests.

In various embodiments, in response to the policy change, the access control management system may generate a test policy to include the updated list of identities granted with the access. The access control management system may associate both the test policy (in regular mode) and the existing access control policy in policy evaluation mode with the resource. Accordingly, when a request from an identity that has recently been requested to lose access comes in, the request may still be granted based on the existing access control policy in policy evaluation mode. In various embodiments, access control policies may be generated, modified, and/or deleted by an authorized user or a system administrator.

In various embodiments, the access control management system may generate (or emit) a policy evaluation log each time a request is authorized based on an access control policy in the policy evaluation mode. A policy evaluation log includes an authorization record that indicates a request is authorized based on an access control policy in policy evaluation mode and that the request was sent from an identity that should no longer have access to the resource based on a recent policy change. In various embodiments, the access control management system generates a system notification based on the policy evaluation log. A system administrator may receive an alert when such a notification is generated.

In various embodiments, the access control management system may remove (or delete) the access control policy in the policy evaluation mode upon determining that a threshold period of time has passed since the last policy evaluation log was generated, indicating the last post-change request was sent from the identity. In this scenario, an assumption may be made that requests from the identity may no longer be expected as the associated systems likely have already been adjusted to avoid sending requests to access the resource. In various embodiments, once the access control policy in the policy evaluation mode is removed or deleted, denials may be incurred based on a new policy (previously the test policy) that reflects the policy change. As this process repeats itself, the more granular access control policies may be generated, while changes to the existing policies may be made with the reduced risks of API outage and the associated system latency.

In various embodiments, a resource may be associated with one or more access control policies. Each resource may be configured to be associated with a limited number (e.g., one) of access control policies in the policy evaluation mode.

In various embodiments, upon determining a lack of a further access control policy in a regular mode that allows the identity to access the resource, the access control management system may authorize the request based on the access control policy in the policy evaluation mode. The access control management system may subsequently generate a policy evaluation log as described herein.

In various embodiments, upon identifying another access control policy (e.g., the second access control policy) in a regular mode that allows the identity to access the resource, the access control management system may authorize the request based on the second access control policy, instead of the access control policy in the policy evaluation mode (e.g., the first access control policy). The access control management system may generate a regular log different from the policy evaluation log. In various embodiments, a regular log may not trigger a generation of a system notification. The policy evaluation log may only be generated when a request is authorized based on an access control policy in the policy evaluation mode.

In various embodiments, an access control policy may include one or more of: a resource field, an action field, an identity field, and a mode field. A service field may include one or more identifiers of identities that are allowed to access one or more resources indicated by the resource field.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example networked environment 100 that includes an access control management system 122, according to various embodiments of the present disclosure. By including the access control management system 122, the networked environment 100 can facilitate access control management using the policy evaluation mode as described herein. As shown, the networked environment 100 includes one or more client devices 102, one or more services 124, a server system 108, and a network 106 (e.g., including Internet, wide-area-network (WAN), local-area-network (LAN), wireless network, etc.) that communicatively couples them together. Each client device 102 can host a number of applications, including a client software application 104. The client software application 104 can communicate data with the server system 108 via a network 106. Accordingly, the client software application 104 can communicate and exchange data with the server system 108 via the network 106. Each service 124 can host its own access control management system (not shown) and a number of applications (not shown). The number of applications associated with the service 124 can communicate data with the server system 108 via the network 106. Accordingly, the one or more services 124 can communicate and exchange data with each other and with the server system 108 via the network 106. In various embodiments, the one or more services 124 may reside within the server system 108 and can communicate with each other directly within the server system 108, without having to communicate indirectly via the network 106 (e.g., the Internet). In various embodiments, the access control policies apply to both external clients, including clients associated with client devices 102 and services 124, and apply to internal services (not shown). Internal services may include services residing within server system 108, such as services between (or within) API server 110 and application server 116, or between (or within) application server 116 and database server 118.

The server system 108 provides server-side functionality via the network 106 to the client software application 104 and the one or more services 124. While certain functions of the networked environment 100 are described herein as being performed by the access control management system 122 on the server system 108, it will be appreciated that the location of certain functionality within the server system 108 is a design choice. For example, it may be technically preferable to initially deploy certain technology and functionality within the server system 108, but later migrate this technology and functionality to the client software application 104. As another example, it may be technically preferable to initially deploy certain technology and functionality within the server system 108, but later migrate this technology and functionality to the one or more services 124. In various embodiments, the client device 102 or the one or more services 124 may request access to one or more resources 126 hosted by the application server 116 in the server system 108. The access control management system may authorize or deny the request based on access control policies using the policy evaluation mode as described herein.

In various embodiments, data exchanges within the networked environment 100 may be invoked and controlled through operations of software component environments available via one or more endpoints, or functions available via one or more user interfaces of the client software application 104 or the one or more services 124, which may include web-based user interfaces provided by the server system 108 for presentation at the client device 102 or the one or more services 124.

With respect to the server system 108, each of an Application Program Interface (API) server 110 and a web server 112 is coupled to an application server 116, which hosts the access control management system 122. The application server 116 is communicatively coupled to a database server 118, which facilitates access to a database 120 that stores data associated with the application server 116, including data that may be generated or used by the access control management system 122, in various embodiments.

The API server 110 receives and transmits data (e.g., API calls, commands, requests, responses, and authentication data) between the client device 102 and the application server 116, and between the one or more services 124 and the application server 116. Specifically, the API server 110 provides a set of interfaces (e.g., endpoint, routines, or protocols) that can be called or queried by the client software application 104 or the one or more services 124 in order to invoke the functionalities of the application server 116. The API server 110 exposes various functions supported by the application server 116, including without limitation: user registration; login functionality; data object operations (e.g., generating, storing, retrieving, encrypting, decrypting, transferring, access rights, licensing, etc.); and user communications.

Through one or more web-based interfaces (e.g., web-based user interfaces), the web server 112 can support various functions of the access control management system 122 of the application server 116, including without limitation: receiving requests to access resources, identifying access control policies based on the request, and authorizing (or denying) the request based on the access control policies using the policy evaluation mode. In various embodiments, the deployment or implementation of the web server 112 and the application server 116 may share the same set of executable code. In various embodiments, the web server 112 may be a subsystem or a component of the application server 116.

The application server 116 hosts a number of applications and subsystems, including the access control management system 122, which supports various functions and services with respect to various embodiments described herein. The application server 116 is communicatively coupled to a database server 118, which facilitates access to database(s) 120 in which may be stored data associated with the access control management system 122.

Figure 2:
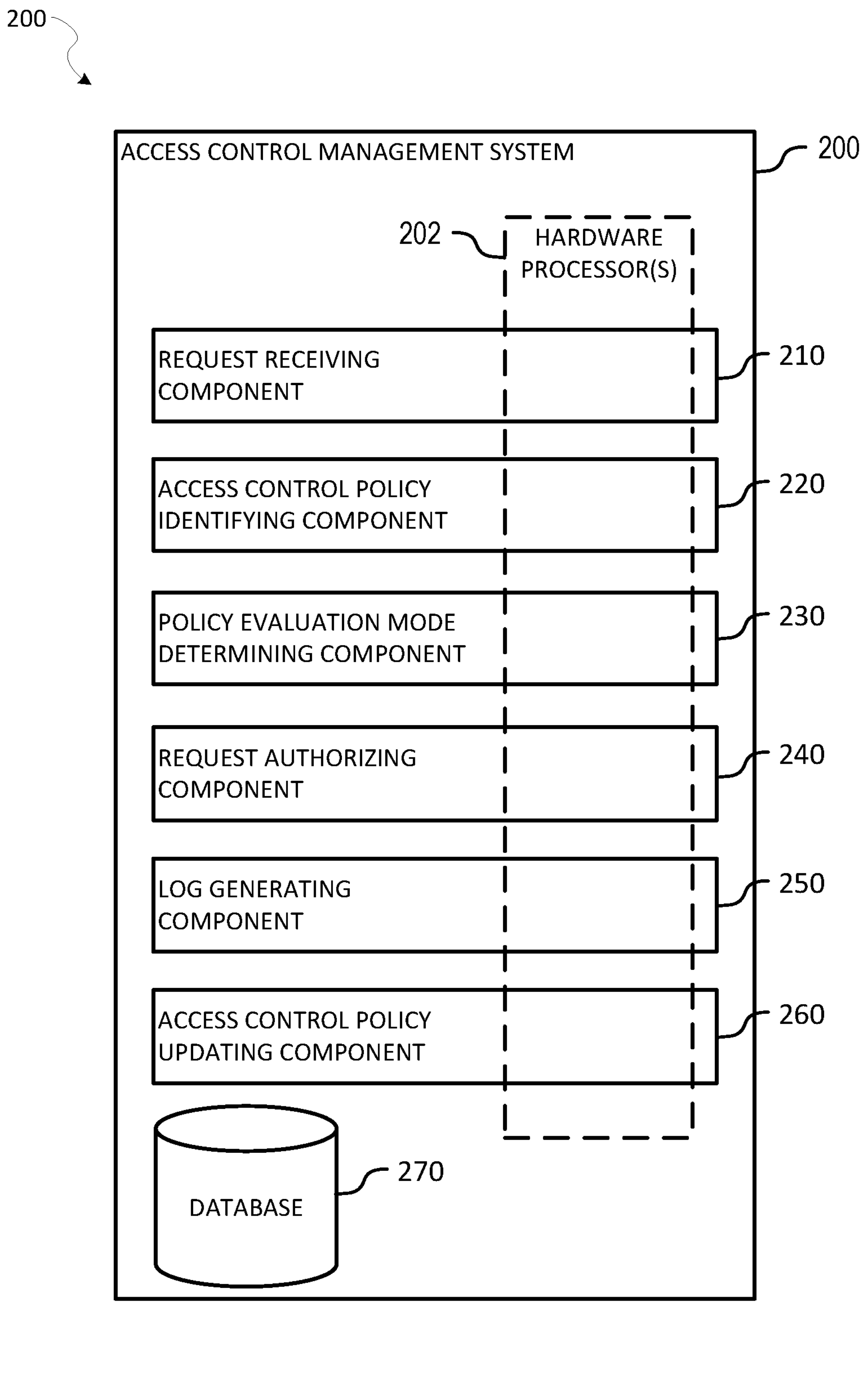
FIG. 2 is a block diagram illustrating an example access control management system, according to various embodiments of the present disclosure.

FIG. 2 is a block diagram illustrating an example access control management system 200, according to various embodiments of the present disclosure. For some embodiments, the access control management system 200 represents an example of the access control management system 122 described with respect to FIG. 1. As shown, the access control management system 200 comprises a request receiving component 210, an access control policy identifying component 220, a policy evaluation mode determining component 230, a request authorizing component 240, a log generating component 250, and an access control policy updating component 260. According to various embodiments, one or more of the request receiving component 210, the access control policy identifying component 220, the policy evaluation mode determining component 230, the request authorizing component 240, the log generating component 250, and the access control policy updating component 260 are implemented by one or more hardware processors 202. Data generated by one or more of the request receiving component 210, the access control policy identifying component 220, the policy evaluation mode determining component 230, the request authorizing component 240, the log generating component 250, and the access control policy updating component 260 is stored in a database 270 of the access control management system 200.

In various embodiments, the request receiving component 210 is configured to receive requests from one or more identities for accessing one or more resources 126. An identity may be a user (e.g., a person or a group of people) associated with a client device 102, a service 124, or an application.

In various embodiments, the access control policy identifying component 220 is configured to identify (or determine) one or more access control policies associated with one or more resources 126. In various embodiments, an access control policy may include one or more of: a resource field, an action field, an identity field, and a mode field. A service field may include one or more identifiers of identities that are allowed to access one or more resources indicated by the resource field. In various embodiments, a resource may be associated with one or more access control policies.

In various embodiments, the policy evaluation mode determining component 230 is configured to determine an access control policy in the policy evaluation mode (e.g., the first access control policy) that allows the identity to access the resource. The policy evaluation mode may also be referred to as traffic check mode. In various embodiments, the policy evaluation mode may be activated in response to a recent policy change to the access control policy or the associated resource. In various embodiments, a policy evaluation mode may indicate that the access control policy includes one or more identities that no longer have access to the resource. For example, a recent change may be made to an access control policy to remove one or more identities from a list of identities with granted access. In response to the change, instead of immediately revising the existing access control policy to deny the one or more identities the access, the existing access control policy may instead be configured to operate in the policy evaluation mode for a controlled period of time. The existing access control policy in the policy evaluation mode may still cause the requests from identities that recently are requested to lose access to the resource to be authorized (or allowed). Under this approach, such identities will be given time (e.g., a threshold period of time after the last post-change request was sent) to adjust their respective services or systems to avoid sending requests to access the resource. Access denials incurred by these identities during the transition period thereby may be largely reduced or be completely avoided, reducing the risks of API outage and the associated system latency.

In various embodiments, each resource may be configured to be associated with a limited number (e.g., one) of access control policies in the policy evaluation mode.

In various embodiments, the policy evaluation mode determining component 230 is further configured to determine if any other access control policy (e.g., the second access control policy) associated with the resource is in a regular mode that also allows the identity to access the resource. A regular mode may be a default mode for an access control policy.

In various embodiments, upon (or in response to) determining a lack of a further access control policy in a regular mode that allows the identity to access the resource, the request authorizing component 240 is configured to authorize the request based on the access control policy in the policy evaluation mode (e.g., the first access control policy). On the other hand, upon determining that there is another access control policy (e.g., the second access control policy) in a regular mode that allows the identity to access the resource, the request authorizing component 240 is configured to authorize the request based on the second access control policy, instead of the access control policy in the policy evaluation mode (e.g., the first access control policy).

In various embodiments, depending on the mode of the access control policy based on which a request is authorized, the log generating component 250 is configured to generate a policy evaluation log or a regular log. For example, if a request is authorized based on an access control policy in regular mode (e.g., the second access control policy), a regular log may be generated to include the authorization record. A policy evaluation log may be generated if a request is authorized based on an access control policy in the policy evaluation mode (e.g., the first access control policy). Policy evaluation mode is used interchangeably as traffic check mode. Policy evaluation log is used interchangeably as traffic check log. A policy evaluation log includes an authorization record that indicates a request is authorized based on an access control policy in policy evaluation mode and that the request was sent from an identity that should no longer have access based on a recent policy change. In various embodiments, a system notification may be generated based on the policy evaluation log. A system administrator may receive an alert when such a notification is generated. In various embodiments, a regular log may not trigger a generation of a system notification.

In various embodiments, in response to detecting a request for one or more changes to an access control policy, the access control policy updating component 260 is configured to generate a test policy to include the updated list of identities granted with the access. In various embodiments, one or more identities may be removed from the list of identities associated with the existing access control policy, since the one or more identities should no longer be granted access to the resource according to the one or more changes to the existing access control policy. The test policy may coexist with the existing policy which is configured to operate in the policy evaluation mode with a control period of time. Upon determining that a threshold period of time has passed since the last policy evaluation log was generated, the access control policy updating component 260 is configured to remove the access control policy in the policy evaluation mode. An assumption may be made at this point that requests from the identity may no longer be expected, as the associated systems likely have already been adjusted to avoid sending requests to access the resource. In various embodiments, once the access control policy in the policy evaluation mode is removed or deleted, denials may be incurred based on a new policy (e.g., the previous test policy) that reflects the policy change.

Figure 3:
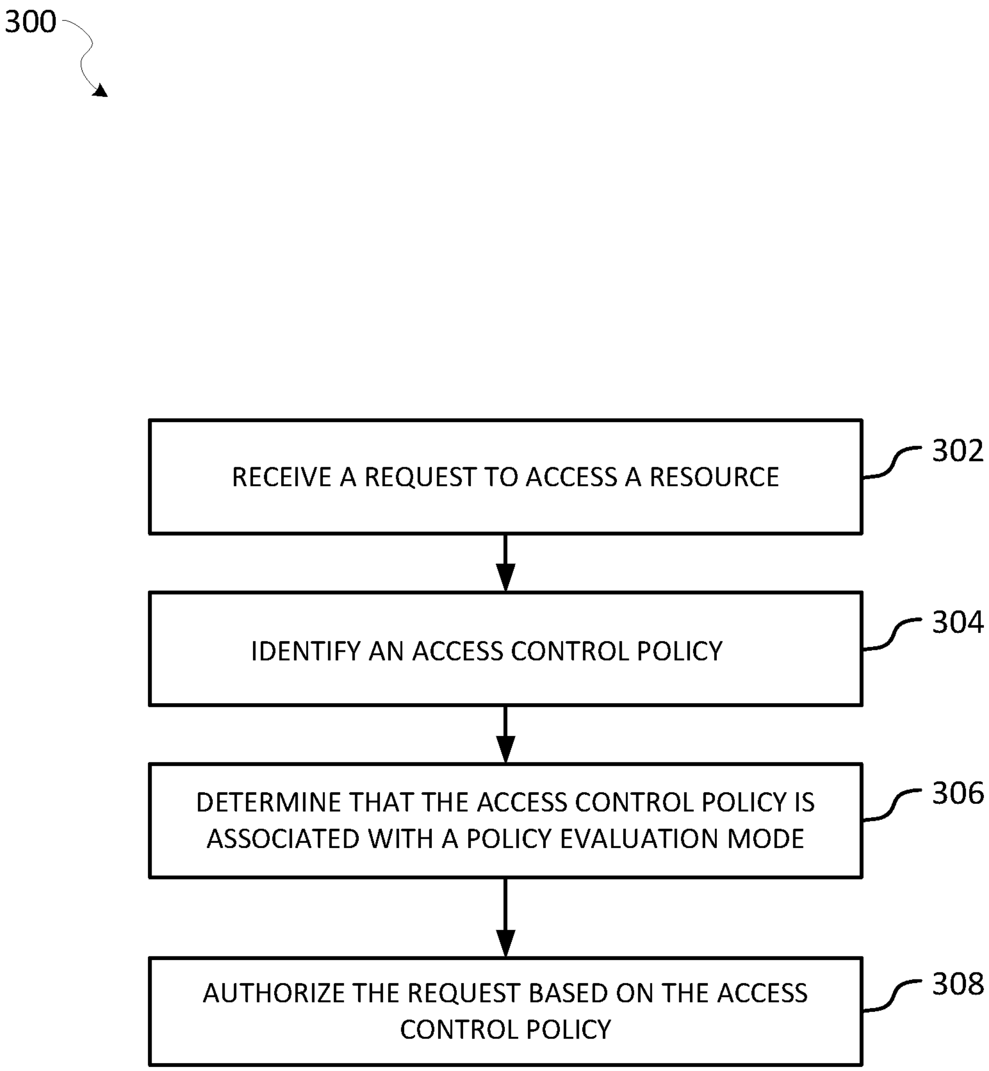
FIG. 3 is a flowchart illustrating an example method for managing access control, according to various embodiments of the present disclosure.

FIG. 3 is a flowchart illustrating an example method 300 for managing access control, according to various embodiments of the present disclosure. It will be understood that example methods described herein may be performed by a machine in accordance with some embodiments. For example, the methods 300 can be performed by the access control management system 122 described with respect to FIG. 1, the access control management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 300 may be represented by executable instructions that, when executed by a processor of a computing device, cause the computing device to perform method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 302, a processor receives one or more requests from one or more identities for accessing one or more resources 126. An identity may be a user (e.g., a person or a group of people) associated with a client device 102, a service 124, or an application.

At operation 304, a processor identifies one or more access control policies associated with one or more resources 126. In various embodiments, an access control policy may include one or more of: a resource field, an action field, an identity field, and a mode field. A service field may include one or more identifiers of identities that are allowed to access one or more resources indicated by the resource field. In various embodiments, a resource may be associated with one or more access control policies.

At operation 306, a processor determines an access control policy in the policy evaluation mode (e.g., the first access control policy) that allows the identity to access the resource. The policy evaluation mode may also be referred to as traffic check mode. In various embodiments, the policy evaluation mode may be activated (by a system administrator or by a system itself) in response to a recent policy change to the access control policy or the associated resource. In various embodiments, a policy evaluation mode may indicate that the access control policy includes one or more identities that no longer have access to the resource based on a recent policy change.

At operation 308, a processor authorizes the one or more requests based on the identified access control policies. In various embodiments, upon (or in response to) determining a lack of a further access control policy in a regular mode that allows the identity to access the resource, the processor authorizes the request based on the access control policy in the policy evaluation mode (e.g., the first access control policy). Alternatively, upon determining that there is another access control policy (e.g., the second access control policy) in a regular mode that also allows the identity to access the resource, the processor authorizes the request based on the second access control policy, instead of the access control policy in the policy evaluation mode (e.g., the first access control policy).

Though not illustrated, the method 300 can include an operation where a graphical user interface for managing access control can be displayed (or caused to be displayed) by the hardware processor. For instance, the operation can cause a computing device to display the graphical user interface for managing access control. This operation for displaying the graphical user interface can be separate from operations 302 through 308 or, alternatively, form part of one or more of operations 302 through 308.

Figure 4:
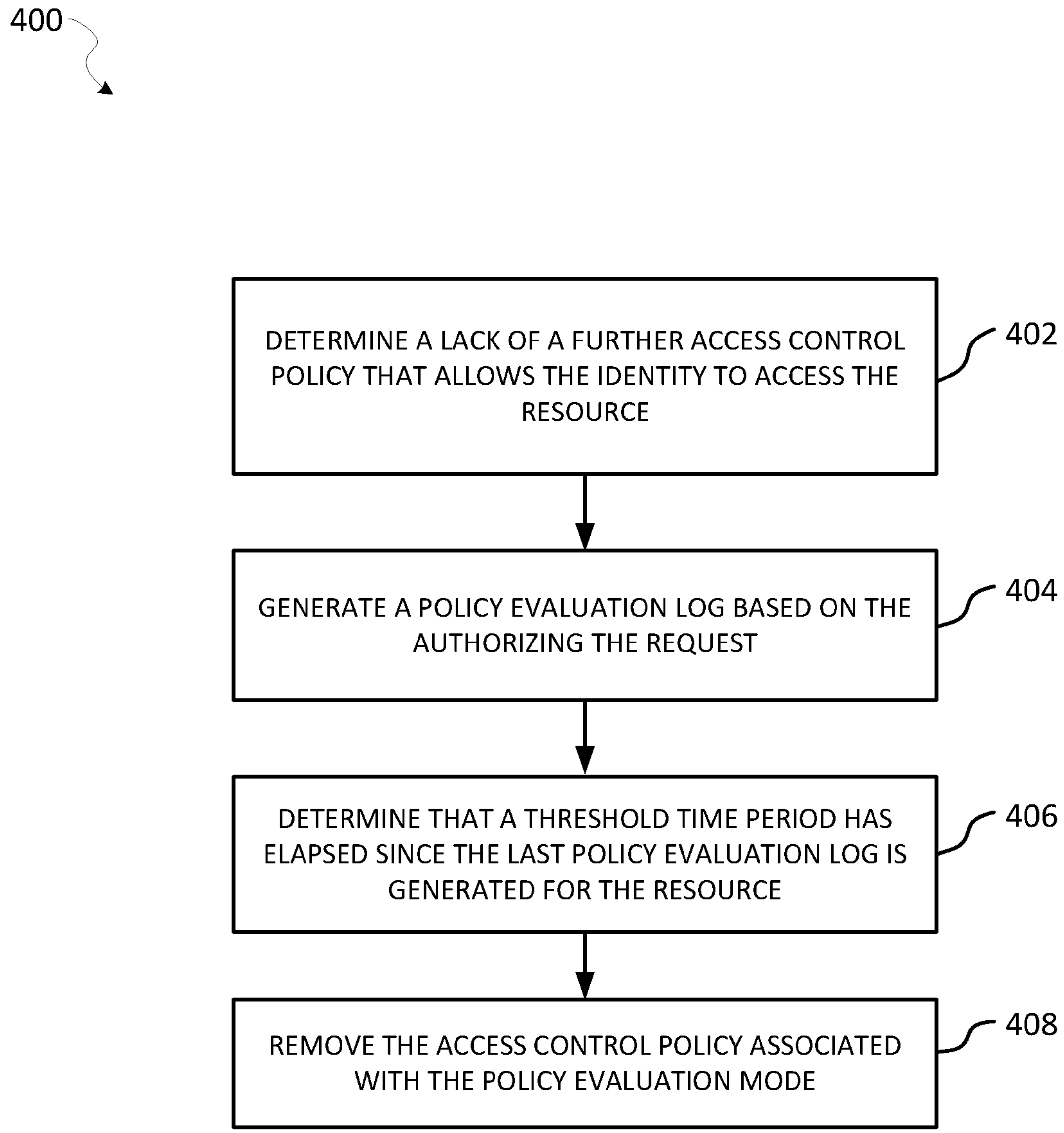
FIG. 4 illustrates a block diagram illustrating an example access control management system during operation, according to various embodiments of the present disclosure.

FIG. 4 is a flowchart illustrating an example method 400 for managing access control, according to various embodiments of the present disclosure. It will be understood that example methods described herein may be performed by a machine in accordance with some embodiments. For example, method 400 can be performed by the access control management system 122 described with respect to FIG. 1, or the access control management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 400 may be represented by executable instructions that, when executed by a processor of a computing device, cause the computing device to perform method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

In various embodiments, one or more operations of the method 400 may be a sub-routine of one or more of the operations of method 300. In various embodiments, one or more operations in method 400 may be performed subsequent to the operations of method 300.

At operation 402, a processor determines a lack of a further access control policy that allows the identity to access the resource. The further access control policy is unassociated with (or not in) the policy evaluation mode, and the identified access control policy in the policy evaluation mode is the only policy that allows the identity to access the resource.

At operation 404, a processor generates a policy evaluation log that indicates the request is authorized based on the access control policy in the policy evaluation mode. The policy evaluation log may also indicate that the request is received from the identity that is no longer granted access to the resource based on a recent policy change.

At operation 406, a processor determines that a threshold time period has elapsed (or passed) since the last policy evaluation log was generated for the resource. An example threshold time period may be any range of time, including but not limited to, a number of days, a month, several months, etc. In various embodiments, the threshold time period, as described herein, may be determined by a system administrator or an authorized user.

At operation 408, in response to determining that the threshold time period has elapsed since the last policy evaluation log was generated for the resource, a processor removes the access control policy in the policy evaluation mode from a list of access control policies identified for the resource. Removal of the access control policy from the list of access control policies may be based on an assumption that requests from the identity may no longer be expected, as the associated systems likely have already been adjusted to avoid sending requests to access the resource. In various embodiments, once the access control policy in the policy evaluation mode is removed or deleted, denials may be incurred based on a new policy (e.g., the previous test policy) that reflects the policy change.

Though not illustrated, the method 400 can include an operation where a graphical user interface for managing access control can be displayed (or caused to be displayed) by the hardware processor. For instance, the operation can cause a computing device to display the graphical user interface for managing access control. This operation for displaying the graphical user interface can be separate from operations 402 through 408 or, alternatively, form part of one or more of operations 402 through 408.

Figure 5:
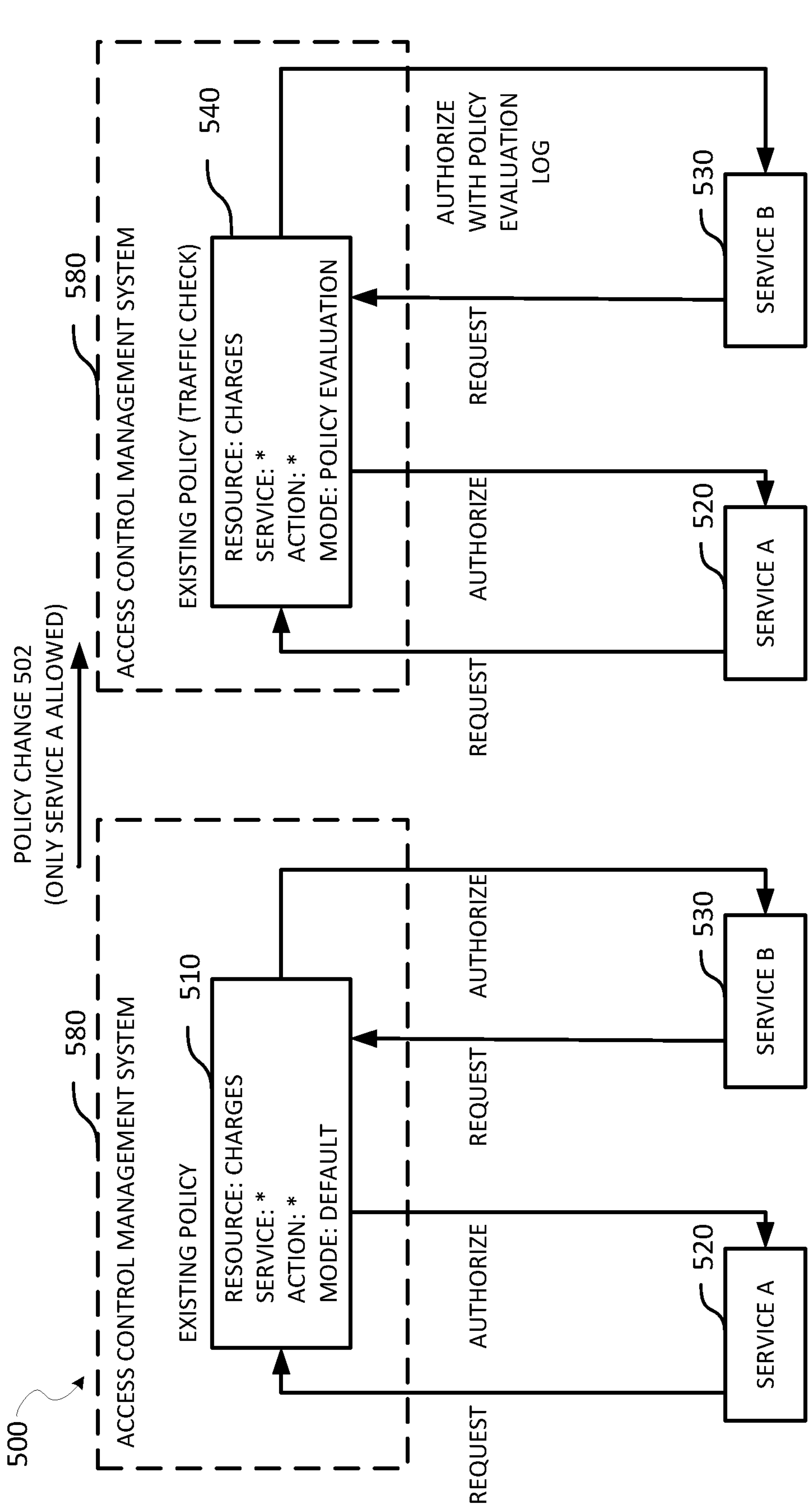
FIG. 5 provides a block diagram illustrating an example access control management system during operation, according to various embodiments of the present disclosure.

FIG. 5 provides a block diagram 500 illustrating an example access control management system during operation, according to various embodiments of the present disclosure. The access control management system 580 may be an example system of the access control management system 122 described with respect to FIG. 1, or the access control management system 200 described with respect to FIG. 2, or individual components thereof.

As shown, the access control management system 580 manages an existing access control policy 510 (also referred to as policy 510). Policy 510 includes a resource field, an action field, an identity field (e.g., service field), and a mode field. In various embodiments, the approach as described herein applies to changing actions, and/or other fields not specified or listed in the policy format, as illustrated in FIG. 5. The resource field includes a data content "charges," indicating the resource associated with the policy. The service field includes a wildcard (i.e., *), representing that any services can be granted access. The action field includes a wildcard, representing that any action can be performed on the resource. The mode field includes a default value, indicating that policy 510 is in a default mode, such as a regular mode. During operation, service A 520 may send a request to perform one or more actions on the resource "charges." The access control management system 580 may authorize the request, as according to policy 510, any service may perform any actions to the resource "charges." A policy change 502 may be detected or received by the access control management system 580. An example policy change may include changing the data content in any of the fields, such as removing one or more services so that only listed service(s) may be granted access to the resource. As shown, policy change 502 is associated with a change to only allow service A to access the resource. Instead of immediately updating the policy 510 to reflect the change, or alternatively, creating a new policy to reflect the change and removing (or deleting) the existing policy 510 from the access control management system 580, the access control management system 580 may change (or flip) the default mode to a policy evaluation mode, as described herein. Policy 540 (previously the policy 510 in default mode) may still authorize requests from service B 530, which currently should not have access to the resource according to the policy change 502. Upon authorizing the request for service B, a policy evaluation log may be generated. In various embodiments, the access control management system 580 may generate logs based on policy 540 for both services A and B. Requests from services A and B would be denied if policy 540 was removed. The timing (e.g., determined via timestamp) of the generation of the last policy evaluation log may help determine if a threshold period of time has passed since the last policy evaluation log was generated. If so, then it indicates policy 540 is safe to remove after a controlled period of time, as described herein.

Figure 6:
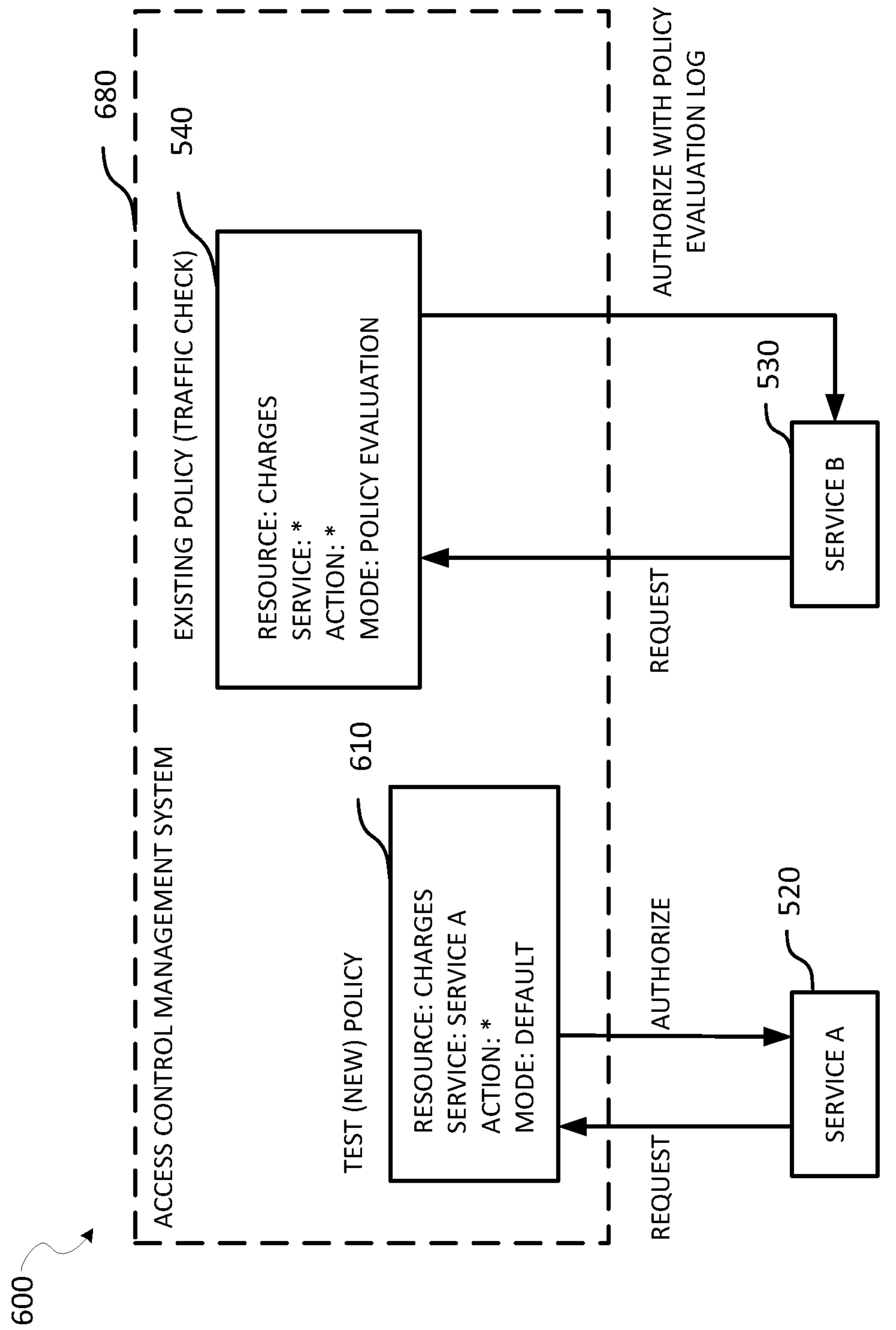
FIG. 6 provides a block diagram illustrating an example access control management system during operation, according to various embodiments of the present disclosure.

FIG. 6 provides a block diagram 600 illustrating an example access control management system during operation, according to various embodiments of the present disclosure. The access control management system 680 may be an example system of the access control management system 122 described with respect to FIG. 1, or the access control management system 200 described with respect to FIG. 2, or individual components thereof.

As shown, the access control management system 680 manages an existing access control policy 540 in the policy evaluation mode (also referred to as policy 540) In response to the policy change 502, as described in FIG. 5, a test policy (new policy) may be created to reflect the policy change 502. The test policy is in default mode and indicates service A is the only service that is allowed access to the resource "charges." The existing policy in policy evaluation mode and the test policy in regular mode coexist for a controlled period of time, during which services other than service A may still be granted access.

In various embodiments, upon determining a lack of a further access control policy (not shown) in the default mode that allows service B to access the resource, the access control management system 680 may authorize the request from service B based on the existing policy 540. A policy evaluation log may subsequently be generated as described herein.

In various embodiments, upon identifying another access control policy (not shown) (e.g., the second access control policy) in a regular mode that allows the service B to access the resource, the access control management system 680 may authorize the request based on the identified second access control policy, instead of the policy 540 in the policy evaluation mode. The access control management system 680 may generate a regular log, which is different from the policy evaluation log as described herein. In various embodiments, a regular log may not trigger a generation of a system notification. The policy evaluation log may only be generated when a request is authorized based on an access control policy in the policy evaluation mode.

In various embodiments, the access control management system 680 determines a threshold time period that has elapsed (or passed) since the last policy evaluation log was generated for the resource "charges." The access control management system 680 may remove policy 540. It is because an assumption may be made at this point that requests from service B or any services other than service A may no longer be expected, as the associated systems likely have already been adjusted to avoid sending requests to access the resource "charges." In various embodiments, once the access control policy in the policy evaluation mode is removed or deleted, denials may be incurred based on a new policy (e.g., policy 610) that reflects the policy change.

In various embodiments, a policy change may be associated with a change to any of the fields included in an access control policy. For example, a policy change may be made to limit the types of actions to "read" only. The policy evaluation mode may be turned on (or configured) based on such a policy change.

Figure 7:
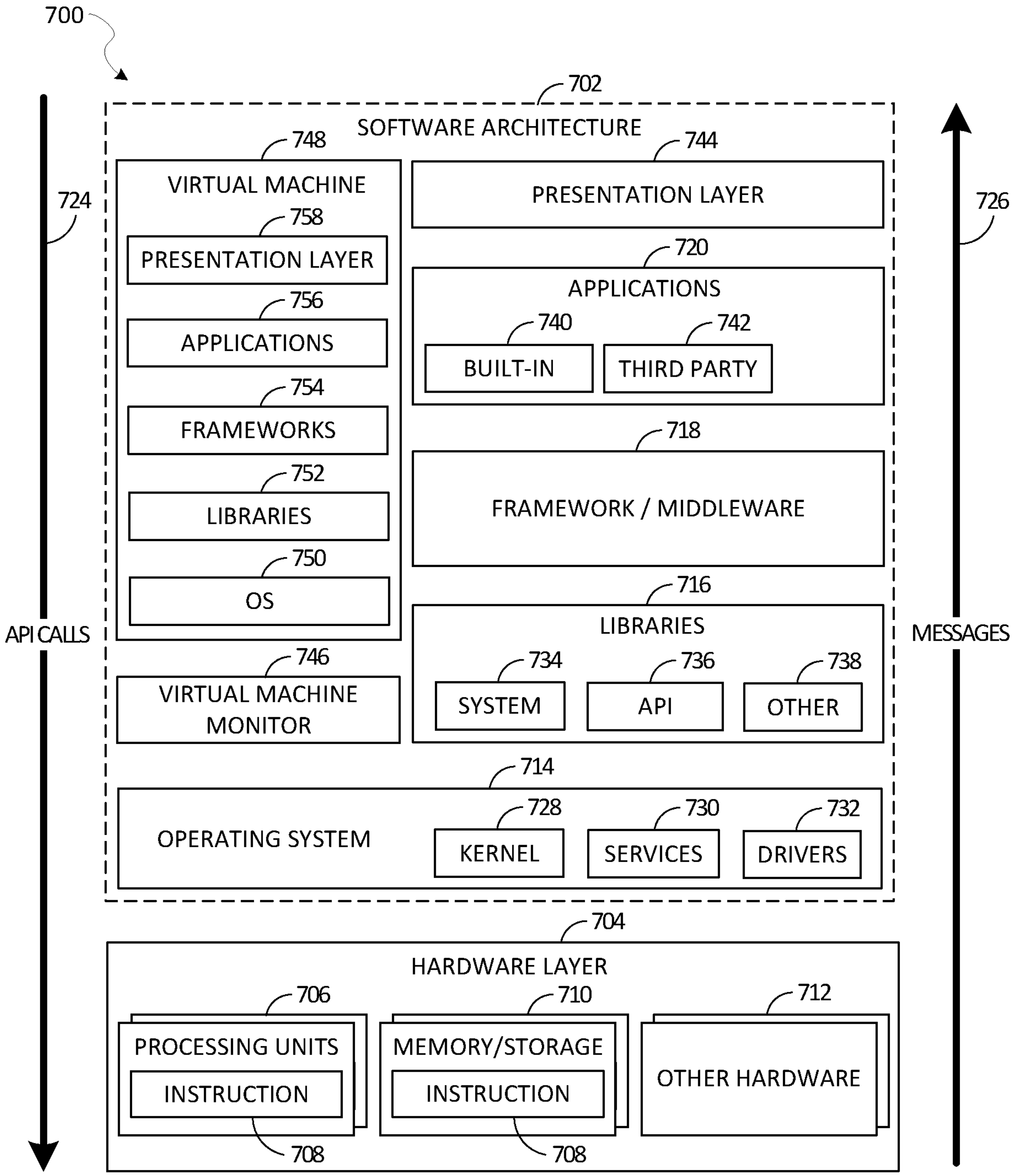
FIG. 7 is a block diagram illustrating a representative software architecture, which may be used in conjunction with various hardware architectures herein described, according to various embodiments of the present disclosure.

FIG. 7 is a block diagram illustrating an example of a software architecture 702 that may be installed on a machine, according to some example embodiments. FIG. 7 is merely a non-limiting example of software architecture, and it will be appreciated that many other architectures may be implemented to facilitate the functionality described herein. The software architecture 702 may be executing on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 comprises one or more processing units 706 having associated executable instructions 708. The executable instructions 708 represent the executable instructions of the software architecture 702. The hardware layer 704 also includes memory or storage modules 710, which also have the executable instructions 708. The hardware layer 704 may also comprise other hardware 712, which represents any other hardware of the hardware layer 704, such as the other hardware illustrated as part of the machine 800.

In the example architecture of FIG. 7, the software architecture 702 may be conceptualized as a stack of layers, where each layer provides particular functionality. For example, the software architecture 702 may include layers such as an operating system 714, libraries 716, frameworks/middleware 718, applications 720, and a presentation layer 744. Operationally, the applications 720 or other components within the layers may invoke API calls 724 through the software stack and receive a response, returned values, and so forth (illustrated as messages 726) in response to the API calls 724. The layers illustrated are representative in nature, and not all software architectures have all layers. For example, some mobile or special-purpose operating systems may not provide a frameworks/middleware 718 layer, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than by interfacing directly with the underlying operating system 714 functionality (e.g., kernel 728, services 730, or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 or other software components/modules. For example, the frameworks 718 may provide various graphical user interface functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a home application, a contacts application, a browser application, a book reader application, a location application, a media application, a messaging application, or a game application.

The third-party applications 742 may include any of the built-in applications 740, as well as a broad assortment of other applications. In a specific example, the third-party applications 742 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 742 may invoke the API calls 724 provided by the mobile operating system such as the operating system 714 to facilitate functionality described herein.

The applications 720 may utilize built-in operating system functions (e.g., kernel 728, services 730, or drivers 732), libraries (e.g., system libraries 734, API libraries 736, and other libraries 738), or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with the user.

Some software architectures utilize virtual machines. In the example of FIG. 7, this is illustrated by a virtual machine 748. The virtual machine 748 creates a software environment where applications/modules can execute as if they were executing on a hardware machine (e.g., the machine 800 of FIG. 8). The virtual machine 748 is hosted by a host operating system (e.g., the operating system 714) and typically, although not always, has a virtual machine monitor 746, which manages the operation of the virtual machine 748 as well as the interface with the host operating system (e.g., the operating system 714). A software architecture executes within the virtual machine 748, such as an operating system 750, libraries 752, frameworks/middleware 754, applications 756, or a presentation layer 758. These layers of software architecture executing within the virtual machine 748 can be the same as corresponding layers previously described or may be different.

Figure 8:
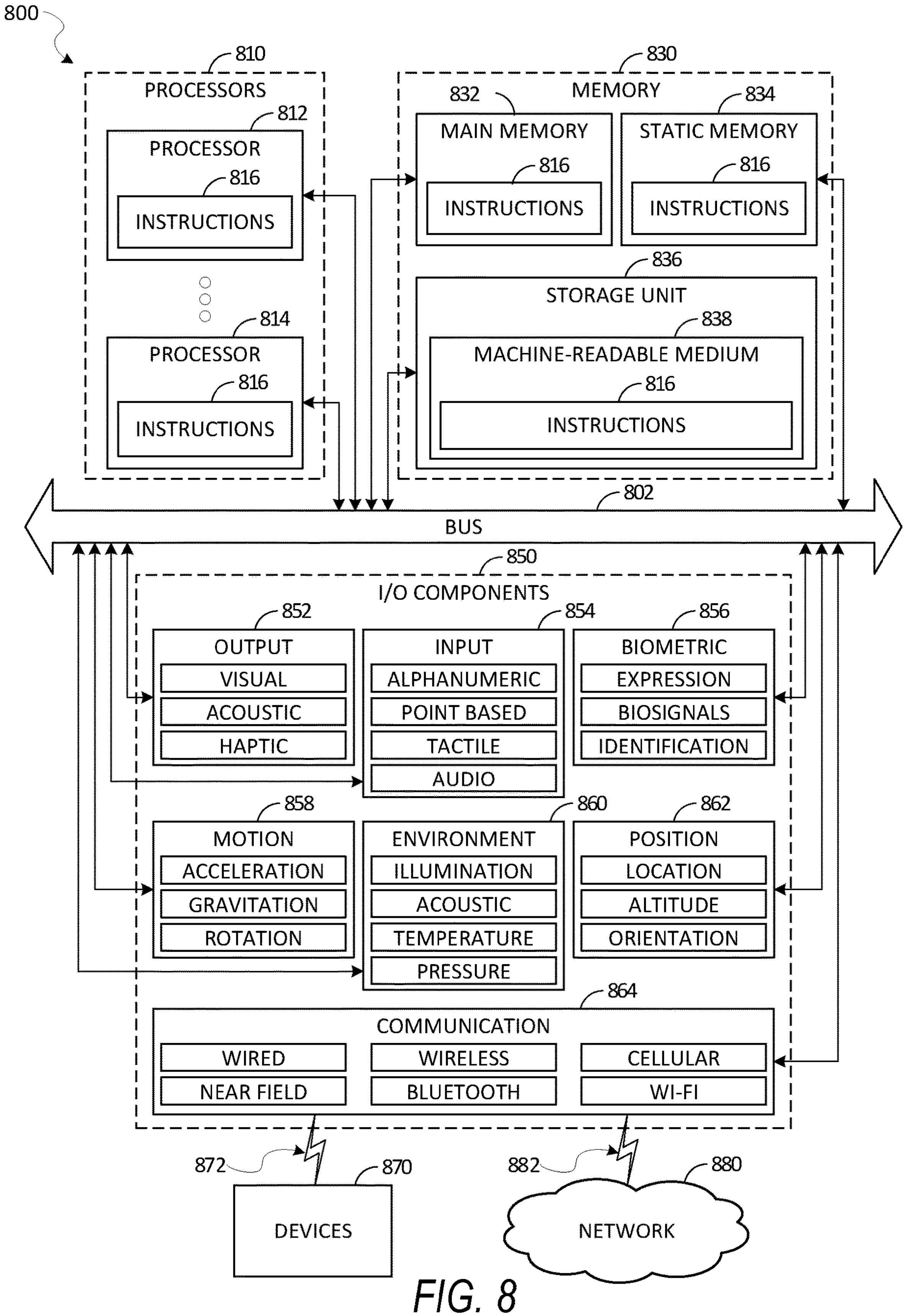
FIG. 8 is a block diagram illustrating components of a machine able to read instructions from a machine storage medium and perform any one or more of the methodologies discussed herein according to various embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method 300 described above with respect to FIG. 3 and the method 400 described above with respect to FIG. 4. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an embodiment, the processors 810 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions contemporaneously. Although FIG. 8 shows multiple processors 810, the machine 800 may include a single processor with a single core, a single processor with multiple cores (e.g., a multi-core processor), multiple processors with a single core, multiple processors with multiples cores, or any combination thereof.

The memory 830 may include a main memory 832, a static memory 834, and a storage unit 836 including machine-readable medium 838, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 850 may include biometric components 856, motion components 858, environmental components 860, or position components 862, among a wide array of other components. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 800 including processors 810), with these operations being accessible via a network (e.g., the Internet) and via one or more appropriate interfaces (e.g., an API). In certain embodiments, for example, a client device may relay or operate in communication with cloud computing systems and may access circuit design information in a cloud environment.

The performance of certain of the operations may be distributed among the processors, not only residing within a single machine 800, but deployed across a number of machines 800. In some example embodiments, the processors 810 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 830, 832, 834, and/or the memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 816 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 880 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:

receiving, from an identity, a request to access a resource by the identity;

identifying, from one or more access control policies comprising a permission for the identity to access the resource, a first access control policy that is capable of operating in a policy evaluation mode that overrides an access-permission-revoking change to a control policy for a temporary time period and causes a pre-change version of the control policy to be in effect during the temporary time period, the policy evaluation mode being activated for the first access control policy, for a threshold amount of time to allow the identity to access the resource for the threshold amount of time, in response to a policy change to the first access control policy indicating that the identity no longer has the access to access the resource;

determining a lack of further access control policy in a regular mode that allows the identity to access the resource;

authorizing the request using the first access control policy in the policy evaluation mode based on determining the lack of further access control policy in the regular mode that allows the identity to access the resource; and in response to determining that a threshold time period has elapsed since a policy evaluation log has been generated for the resource, deleting the first access control policy that is operating in the policy evaluation mode.

2. The method of claim 1, further comprising:

generating a policy evaluation log based on the request being authorized using the first access control policy.

3. The method of claim 1, further comprising:

in response to authorizing the request using the first access control policy, generating a system notification based on the policy evaluation log.

4. The method of claim 1, wherein the policy evaluation log is an authorization record.

5. The method of claim 1, wherein the first access control policy allows a plurality of identities to access the resource, the plurality of identities including the identity.

6. The method of claim 1, wherein the identity is a service.

7. The method of claim 1, wherein the resource is associated with a plurality of access control policies, and wherein each access control policy from the plurality of access control policies is associated with a resource field, an action field, an identity field, and a mode field.

8. The method of claim 7, wherein the identity field includes one or more identifiers of identities that are allowed to access one or more resources indicated by the resource field.

9. The method of claim 1, further comprising:

configuring a threshold number of the one or more access control policies to operate in the policy evaluation mode for the resource.

10. A system comprising:

one or more processors and non-transitory computer-readable media comprising instructions that, when executed by the one or more processors, cause operations comprising:

receiving, from an identity, a request to access a resource by the identity;

determining one or more access control policies that correspond to the access to the resource;

identifying, from the one or more access control policies, (i) a first access control policy that is capable of operating in a policy evaluation mode that overrides an access-permission-revoking change to a control policy for a temporary time period and causes a pre-change version of the control policy to be in effect during the temporary time period, the policy evaluation mode being activated for the first access control policy, for a threshold amount of time to allow the identity to access the resource for the threshold amount of time, in response to a policy change to the first access control policy;

determining a lack of further access control policy in a regular mode that allows the identity to access the resource;

authorizing the request using the first access control policy in the policy evaluation mode based on determining the lack of further access control policy in the regular mode that allows the identity to access the resource; and in response to determining that a threshold time period has elapsed since a policy evaluation log has been generated for the resource, deleting the first access control policy that is operating in the policy evaluation mode.

11. The system of claim 10, wherein the operations further comprise:

in response to authorizing the request to access the resource, generating a regular log indicating that the request to access the resource by the identity is authorized for the identity to access to the resource.

12. The system of claim 10, wherein the operations further comprise:

generating a different access control policy based on a detected change to the first access control policy.

13. The system of claim 12, wherein the different access control policy is a test policy.

14. The system of claim 10, wherein another access control policy allows a plurality of identities to access the resource, the plurality of identities including the identity.

15. The system of claim 10, wherein the identity is a service.

16. The system of claim 10, wherein the resource is associated with a plurality of access control policies, and wherein each access control policy from the plurality of access control policies is associated with a resource field, an action field, an identity field, and a mode field.

17. The system of claim 16, wherein the identity field includes one or more identifiers of identities that are allowed to access one or more resources indicated by the resource field.

18. A non-transitory computer-readable medium comprising instructions that, when executed by one or more hardware processors of a device, cause the device to perform operations comprising:

receiving, from an identity, a request to access a resource by the identity;

identifying, from one or more access control policies comprising a permission for the identity to access the resource, a first access control policy that is capable of operating in a policy evaluation mode that overrides an access-permission-revoking change to a control policy for a temporary time period and causes a pre-change version of the control policy to be in effect during the temporary time period, the policy evaluation mode being activated for the first access control policy, for a threshold amount of time to allow the identity to access the resource for the threshold amount of time, in response to a policy change to the first access control policy;

determining a lack of further access control policy in a regular mode that allows the identity to access the resource;

authorizing the request using the first access control policy in the policy evaluation mode based on determining the lack of further access control policy in the regular mode that allows the identity to access the resource; and in response to determining that a threshold time period has elapsed since a policy evaluation log has been generated for the resource, deleting the first access control policy that is operating in the policy evaluation mode.

* * * * *